United States Patent [19]

Kolycheck

[11] Patent Number: 5,047,495

[45] Date of Patent: Sep. 10, 1991

[54] POLYURETHANE FOR FLEXIBLE FUEL CONTAINERS

[75] Inventor: Edmond G. Kolycheck, Lorain, Ohio

[73] Assignee: The B. F. Goodrich Company, Akron, Ohio

[21] Appl. No.: 399,645

[22] Filed: Aug. 28, 1989

[51] Int. Cl.$^5$ .............................................. C08G 18/38
[52] U.S. Cl. ........................................ 528/76; 528/44; 528/80; 523/220; 524/456
[58] Field of Search .......................... 528/76, 44, 80; 523/220; 524/456

[56] References Cited

U.S. PATENT DOCUMENTS

| | | | |
|---|---|---|---|
| 2,657,151 | 10/1953 | Gensel et al. | 427/343 |
| 2,871,218 | 1/1959 | Schollenberger | 525/83 |
| 3,012,992 | 12/1961 | Pigott et al. | 528/79 |
| 3,214,411 | 10/1965 | Saunders et al. | 528/67 |
| 3,528,948 | 9/1970 | Reuter | 528/76 |
| 3,706,710 | 12/1972 | Camilleri et al. | 528/67 |
| 4,169,196 | 9/1979 | Ehrlich et al. | 528/58 |
| 4,191,818 | 3/1980 | Illers | 528/44 |
| 4,400,498 | 8/1983 | Konishi et al. | 528/60 |
| 4,439,552 | 3/1984 | Dedolph | 521/159 |
| 4,487,913 | 12/1984 | Chung | 528/83 |
| 4,565,729 | 1/1986 | Liggett et al. | 428/201 |
| 4,689,385 | 8/1987 | MacPhee et al. | 528/58 |
| 4,762,884 | 8/1988 | Goyert et al. | 525/28 |
| 4,871,789 | 10/1989 | Martinez | 523/220 |
| 4,877,856 | 10/1989 | Hall et al. | 528/76 |

*Primary Examiner*—John Kight, III
*Assistant Examiner*—Duc Truong
*Attorney, Agent, or Firm*—Debra L. Pawl; Daniel J. Hudak

[57] ABSTRACT

A polyurethane reinforced fabric molded flexible fuel tank comprises a high molecular weight thermoplastic polyurethane polymer binder melt applied to reinforcing fabric and molded into a flexible fuel tank or container for storage of gasoline or jet fuels. The polyurethane polymer has an average molecular weight from about 60,000 to about 500,000 and particularly exhibits excellent fuel resistance.

The high molecular weight thermoplastic polyurethane comprises the polymeric reaction product of an ethylene ether oligomer glycol intermediate co-reacted with a non-hindered diisocyanate and an extender glycol to produce the polyurethane polymer. The ethylene ether oligomer glycol intermediate is selected from (a) a diethylene glycol-aliphatic linear polyester or (b) a polyethylene glycol. The oligomer glycol intermediate has an average molecular weight from about 500 to about 5,000.

14 Claims, No Drawings

POLYURETHANE FOR FLEXIBLE FUEL CONTAINERS

FIELD OF THE INVENTION

The present invention pertains to polyurethane elastomers and more particularly to high molecular weight, thermoplastic polyurethanes used in the molding of fabric reinforced, portable flexible fuel containers utilized, for example, by the military for the storage of gasoline or jet fuels.

BACKGROUND

Flexible fuel tanks utilized for the storage of gasoline or jet fuel require extended fuel resistance and hydrolytic stability along with toughness, resiliency, and sufficient flexibility to maintain strength and integrity in weather extremes while in constant contact with aliphatic hydrocarbon fuels. Rigid structure fuel tanks can be constructed of fiberglass or nylon fabrics saturated with thermosetting polymers which ordinarily provide good rigid structural properties along with the desired fuel resistance. However, crosslinked polymers do not provide the necessary flexibility and resiliency required in the construction of flexible fuel tanks. Although, generally, thermoplastic polymers and particular thermoplastic polyurethanes can provide flexibility, they invariably do not exhibit adequate structural strengths and flexibility and lack long term resistance to hydrocarbon liquid fuels as well as necessary hydrolytic stability. The physical properties and specifications of polymers, polymeric composites, and flexible fuel tanks constructed therefrom are set forth in MIL T52983B (Sept. 17, 1984) and the test for fuel resistance is set forth in ASTM D471-79 and particularly for resistance to fuels B and D. Fuel tanks generally have been suggested based on polyurethane polymers. In U.S. Pat. No. 4,487,913, for instance, complex thermosetting polyurethane polymers are crosslinked in the construction of aircraft fuel tanks typically comprising rigid structures. Similarly, U.S. Pat. No. 4,565,729 discloses a multilayer rigid laminate for rigid structural fuel tanks used on aircraft based on thermosetting amine crosslinked polyurethane polymers. Polyurethane coated fabrics used in unrelated flexible fabric constructions are disclosed in U.S. Pat. No. 4,689,385 (face masks) and U.S. Pat. No. 2,657,151 (raincoats). Unreinforced thermoplastic polyurethane elastomers for general use are disclosed in U.S. Pat. No. 4,169,196, U.S. Pat. No. 3,528,948 and U.S. Pat. No. 3,706,710 based on polyester polyols reacted with diisocyanates and extended with low molecular weight diols. In addition to not being combined with fabrics for either rigid or flexible reinforced products, the polymers disclosed in these patents are merely general purpose polyurethane elastomers which do not necessarily exhibit high resistance to aliphatic hydrocarbon fuels or hydrolytic resistance or other structural and utility characteristics necessary for the construction of flexible fuel tanks. Other polyurethane polymers including polyester based polyurethanes are disclosed in the following patents: U.S. Pat. No. 2,871,218 disclosing extruded plastic sheets resistant to hydrocarbon solvents but soluble in polar solvents; U.S. Pat. No. 4,400,498 pertaining to heat and solvent resistant crosslinked polyurethanes particularly adapted to disperse fillers and pigments and useful for adhesives; U.S. Pat. No. 4,191,818 directed to heat resistent, crosslinked crystalline polyurethanes used in elastomeric cast moldings; U.S. Pat. No. 3,214,411 suggesting polyester polyurethane polymers adapted to be heat crosslinked in high heat injection molding processes; and U.S. Pat. No. 3,012,992 disclosing load bearing, crosslinked polyurethane castings and plastics. U.S. Pat. No. 4,439,552 discloses cellular polyurethane foams, whereas U.S. Pat. No. 4,762,884 discloses radiation activated crosslinked polyurethanes.

The physical, chemical and structural requirements for flexible fuel tanks are set forth in MIL-T52983B (Sept. 17, 1984) including prolonged flexibility and durability, resiliency and toughness, especially prolonged hydrocarbon fuel resistance and hydrolytic stability, high tensile strength before and after immersion in water or fuel, and certain stress-strain requirements such as tensile strength, percent elongation, and percent modulus. However, various polyurethane polymers ordinarily considered to exhibit excellent physical properties have been found inadequate. Polyurethane polymers based on polycaprolactone polyol, polytetramethylene ether glycol, and poly(tetramethylene adipate) glycol, are unsatisfactory and in particular lack satisfactory resistance to aliphatic hydrocarbon fuels. Polycaprolactone polyurethanes and polyether polytetramethylene ether glycol polyurethanes, for example. exhibited adequate hydrolytic stability but lacked sufficient resistance to liquid hydrocarbon fuels.

SUMMARY OF THE INVENTION

It now has been found that a flexible, resilient fuel tank exhibiting excellent fuel resistance exceeding the requirements of ASTM D471-79 can be constructed from a high molecular weight, thermoplastic polyurethane polymeric binder combined with a fibrous mat reinforcement and molded into a flexible fuel container construction. The polyurethane polymer has an average molecular weight from about 60,000 to about 500,000 and comprises a hydroxyl terminated ethylene ether oligomer glycol intermediate having an average molecular weight from about 500 to 5,000 reacted with a non-hindered diisocyanate and an extender glycol to produce a high molecular weight thermoplastic polyurethane. The ethylene ether oligomer glycol intermediate is selected from (a) an hydroxyl terminated, diethylene glycol aliphatic linear polyester and (b) a polyethylene glycol. The polyurethane thermoplastic can be combined, e.g. melt applied, with a fibrous mat or similar reinforcement and molded under heat into a flexible fuel container having excellent fuel resistance and hydrolytic stability. These and other advantages of the present invention will become more apparent by referring to the detailed description of the invention and the illustrative examples.

DETAILED DESCRIPTION OF THE INVENTION

The thermoplastic polyurethane polymer of the present invention, useful as an elastomeric melt or binder in a fabric reinforced flexible fuel tank, comprises the reaction of a hydroxyl terminated ethylene ether oligomer intermediate with a non-hindered diisocyanate and an extender glycol, where the oligomer can be a diethylene glycol-aliphatic polyester, or a polyethylene glycol.

Referring first to the polyester intermediate, a hydroxyl terminated, saturated polyester polymer is synthesized by reacting excess equivalents of diethylene glycol with considerably lesser equivalents of an aliphatic, preferably an alkyl, dicarboxylic acid having four to ten carbon atoms where the most preferred is adipic acid. Other useful dicarboxylic acids include succinic, glutaric, pimelic, suberic, azelaic and sebacic acids. The most preferred polyester intermediate is polydiethylene glycol adipate. In accordance with this aspect of the present invention, excess moles of diethylene glycol are reacted with lesser moles of dicarboxylic acid at levels from about 5 mole percent to about 50 mole percent excess of glycol to provide a hydroxyl terminated polyester oligomer chain having an average molecular weight between about 500 to 5000 and preferably between about 700 and 2500. The short chain polyester oligomer contains repeating diethylene ether structures and comprises on an equivalent basis from about 1.05 to 1.5 equivalents of diethylene glycol co-reacted with one equivalent of dicarboxylic acid to produce the low molecular weight polyester oligomer intermediate. The high excess equivalents of diethylene glycol controls the molecular weight of the polyester oligomer preferably below 2500 and further assures a hydroxyl terminated linear polyester oligomer. The polyester oligomers synthesized by reacting the diethylene glycol with lesser equivalents of dicarboxylic acid at temperatures of from about 300° F. to 450° F. in the absence or in the presence of an esterification catalyst such as stannous chloride for time sufficient to reduce the Acid No. to about zero.

The hydroxyl terminated polyester oligomer intermediate is further reacted with considerably excess equivalents of non-hindered diisocyanate along with extender glycol in a so-called one-shot or simultaneous coreaction of oligomer, diisocyanate, and extender glycol to produce the very high molecular weight linear polyurethane having an average molecular weight broadly from about 60,000 to 500,000, preferably from about 80,000 to 180,000, and most preferably from about 100,000 to 180,000. The very high molecular weight linear polyurethane based on the polyester oligomer in accordance with this aspect of the invention is unique in that an extraordinary high molecular weight polyurethane polymer is produced from a low molecular weight polyester oligomer prepolymer.

In accordance with a further aspect of this invention an ethylene ether oligomer glycol intermediate comprising a polyethylene glycol can be co-reacted with non-hindered diisocyanate and extender glycol to produce the high molecular weight polyurethane polymer. Useful polyethylene glycols are linear polymers of the general formula $H-(OCH_2CH_2)-_nOH$ where n is the number of repeating ethylene ether units and n is at least 11 and between 11 and about 115. On a molecular weight basis, the useful range of polyethylene glycols have an average molecular weight from about 500 to 5000 and preferably from about 700 to 2500. Commercially available polyethylene glycols useful in this invention are typically designated as polyethylene glycol 600, polyethylene glycol 1500, and polyethylene glycol 4000.

In accordance with this invention, high molecular weight thermoplastic polyurethanes are produced by reacting together preferably in a one-shot process the ethylene ether oligomer glycol intermediate, an aromatic or aliphatic non-hindered diisocyanate, and an extender glycol. On a mole basis, the amount of extender glycol for each mole of oligomer glycol intermediate is from about 0.1 to about 3.0 moles, desirably from about 0.2 to about 2.1 moles, and preferably from about 0.5 to about 1.5 moles. On a mole basis, the high molecular weight polyurethane polymer comprises from about 0.97 to about 1.02 moles, and preferably about 1.0 moles of non-hindered diisocyanate for every 1.0 total moles of both the extender glycol and the oligomer glycol (i.e. extender glycol + oligomer glycol = 1.0).

Useful non-hindered diisocyanates comprise aromatic non-hindered diisocyanates and include, for example, 1,4-diisocyanatobenzene (PPDI), 4,4'-methylenebis (phenyl isocyanate) MDI), 1,5-naphthalene diisocyanate (NDI), m-xylene diisocyanate (XDI), as well as non-hindered, cyclic aliphatic diisocyanates such as 1,4-cyclohexyl diisocyanate (CHDI), and $H_{12}$ MDI. The most preferred diisocyanate is MDI. Suitable extender glycols (i.e. chain extenders) are aliphatic short chain glycols having two to six carbon atoms and containing only primary alcohol groups. Preferred glycols include diethylene glycol, 1,3 propane diol, 1,4-butane diol, 1,5-pentane diol, and 1,6-hexane diol with the most preferred glycol being 1,4-butane diol.

In accordance with the present invention, the hydroxyl terminated ethylene ether oligomer intermediate, the non-hindered diisocyanate, and the aliphatic extender glycol are co-reacted simultaneously in a one-shot polymerization process at a temperature above about 100° C. and usually about 120° C., whereupon the reaction is exothermic and the reaction temperature is increased to about 200° C. to 250° C.

The resulting high molecular weight, thermoplastic polyurethane of this invention is particularly useful as a polymeric binder melt applied to reinforcing fabric which can be molded under heat and pressure into a flexible fuel tank for storage of gasoline or jet fuels. The polyurethane particularly exhibits excellent resistance to fuels B and D measured according to ASTM D471-79. In particular, the polyurethane of this invention exhibits an original tensile strength of at least 3,000, desirably at least 4,000 and preferably at least 5,000 psi and advantageously exhibits a tensile strength after 14 days immersion in fuel B of at least 80 percent, desirably at least 85 percent, and preferably at least 95 percent of the original tensile strength.

Fuel B is defined as in ASTM D471-79 as 30 percent toluene and 70 percent isoctane by volume.

Fuel D is defined as in ASTM D471-79 as 60 percent isoctane and 40 percent toluene by volume.

The polyurethane further exhibits excellent resistance to styrene as well as excellent hydrolytic stability. Resistance to styrene was tested by immersing polyurethane test films of about 250 microns thickness for one day, 3 days, and seven days respectively. At the end of each test period, stress-strain properties, volume swell and weight gain were determined.

The merits of the present invention will be better understood by referring to the following illustrative examples.

EXAMPLE 1

Polyester

Poly(diethylene adipate) glycol is commercially available as Formrez 11-112 from Witco and Inolex 1100-110 and had the following characteristics:

| Backbone molecular weight | 1103 |
|---|---|
| Hydroxyl number | 101 |
| Acid No. | 0.1 |

| -continued | |
|---|---|
| Percent water content | 0.024 |

The resulting polyester was blended with 1,4-butane diol and MDI on a weight basis as follows:

Polyurethane 0.25 moles (275 grams) of poly(diethylene adipate) glycol with a molecular weight of 1100 was blended at 60° C. with 0.515 moles (46.36 grams) of 1,4-butane diol chain extender. This blend or physical mixture was then reacted with 0.765 moles (191.25 grams) of methylene bis diphenyl diisocyanate (MDI) by a standard random melt polymerization procedure. This procedure involved heating the poly(diethylene adipate) glycol/1,4-butane diol blend and MDI separately to about 100° C. and then mixing the ingredients. The reaction is exothermic and raises the temperature to about 200° to 250° C. in about 1 to 5 minutes, during which time polymerization takes place as evidenced by an increase in viscosity. Stabilizers such as UV absorbers and antioxidants and lubricants (i.e. processing aids) can be added as desired during the polymerization step or added to the monomers prior to the reaction. The polyurethane had a melt index (190° C./8700 grams) of 35 grams/10 minutes.

Polyurethane Test

Samples were prepared for fuel immersion testing in fuels B and D immersion testing with the results indicated hereafter in Tables IA and IB.

TABLE IA

Fuel B resistance according to ASTM D471-79.
a) Immediate melt index (190° C./8700 gms. load) = 35 gms/ 10 min.
b) Original properties
  Tensile strength = 5000 psi
  % Elongation = 570
  300% Modulus = 1900 psi
c) Fuel B immersion 70 hours @23° C.
  Tensile strength = 4500 psi
  % Elongation = 600
  300% Modulus = 1700 psi
  % Volume change = 8.43
  % Weight change = 5.89
d) Fuel B immersion two weeks @23° C.
  Tensile strength = 4300 psi
  % Elongation = 600
  300% Modulus = 1700 psi
  % Volume change = 7.33
  % Weight change = 4.69

TABLE IB

Fuel D resistance according to ASTM D471-79.
a) Immediate melt index (190° C./8700 gms. load) = 35 gms/10 min.
b) Original properties
  Tensile Strength = 5000 psi
  % Elongation = 570
  300% Modulus = 1900 psi
c) Fuel D immersion 70 hours @23° C.
  Tensile strength = 3750 psi
  % Elongation = 600
  300% Modulus = 1550 psi
  % Volume change = 11.24
  % Weight change = 7.09
d) Fuel D immersion two weeks @23° C.
  Tensile strength = 3600 psi
  % Elongation = 570
  300% Modulus = 1500 psi
  % Volume change = 9.55
  % Weight change = 6.85

EXAMPLE 2

0.2 moles (290 grams) of polyethylene glycol (Dow E-1450) with a molecular weight of 1450 was blended at 60° C. with 0.844 moles (75.96 grams) of 1,4-butanediol chain extender. This blend or physical mixture was then reacted with 1.044 moles (26 grams) of methylene bis diphenyl diisocyanate (MDI) by a standard high temperature random melt polymerization procedure. The polymerization procedure was as described in Example 1. Test data including physical properties and fuel resistance are set forth in Tables IIA, IIB, and IIC.

TABLE IIA

Evaluation of Polyurethane of Example 2

| | ASTM Test - Procedure | |
|---|---|---|
| Tensile Strength (1) | D-412 | 3060 |
| Elongation, % | | 560 |
| 100% Modulus, psi | | 1100 |
| 300% Modulus, psi | | 2030 |
| Tensile Set, % | | 20 |
| Graves Tear, ppi | D-624 (Die C) | 413 |
| Trouser Tear, ppsi | D-470 | 117 |
| Shore Hardness, A/D | D-2240 | 85/40 |
| Vicat Softening, °C. | D-1525 (B) | 95 |
| Tg, °C. TP-113 | | −24 |
| Specific Gravity | D-792 | 1.22 |
| Melt Index (190° C./ 8700 gms), gms/10 min. | | 29.5 |

(1) 30 mil extruded strip.

TABLE IIB

Evaluation of Hydrolytic Stability

| Melt Index (190° C./8700 gm) gms/10 min. Original | 40 |
|---|---|
| Tensile Strength, psi | 3470 |
| Elongation, % | 490 |
| 100% Modulus, psi | 1450 |
| 300% Modulus, psi | 2600 |
| Two Weeks Water @ 71° C.(1) | |
| Tensile Strength, psi | 3750 (−8) |
| Elongation, % | 460 (−6) |
| 100% Modulus, psi | 1900 (+31) |
| 300% Modulus, psi | 3020 (+16) |
| Four Weeks Water @ 71° C.(1) | |
| Tensile Strength, psi | 3490 (+0.6) |
| Elongation, % | 480 (−2) |
| 100% Modulus, psi | 1840 (−27) |
| 300% Modulus, psi | 2740 (+5) |
| Six Weeks Water @ 71° C.(1) | |
| Tensile Strength, psi | 3350 (−3) |
| Elongation, % | 410 (−16) |
| 100% Modulus, psi | 1900 (+31) |
| 300% Modulus, psi | 2800 (+8) |

( ) = % Change
(1)After immersion, prior to stress-strain testing, all samples were conditioned according to Method 6111 of FED-STD-601. All samples are dumbbells from a 75 mil compression molded tensile sheet.

TABLE IIC

Evaluation of Produced Fuel "D" Resistance

| Sample Number | 161-212-46B |
|---|---|
| Melt Index (190° C./8700 gm) gms/10 min. | 40 |
| Original Properties(1) | |
| Tensile Strength, psi | 3870 |
| Elongation, % | 600 |

TABLE IIC-continued

| Evaluation of Produced Fuel "D" Resistance | |
|---|---|
| Sample Number | 161-212-46B |
| 100% Modulus, psi | 1280 |
| 300% Modulus, psi | 2220 |
| Immersion Fuel D 70 hrs. @ 23° C. | |
| Tensile Strength, psi | 3320 |
| Elongation, % | 500 |
| 100% Modulus, psi | 1110 |
| 300% Modulus, psi | 2220 |
| % Volume Change | 10.2 |
| % Weight Change | 7.1 |
| Immersion Fuel D 2 weeks @ 23° C. | |
| Tensile Strength, psi | 3500 |
| Elongation, % | 440 |
| 100% Modulus, psi | 1200 |
| 300% Modulus, psi | 2420 |
| % Volume Change | 9.9 |
| % Weight Change | 7.2 |

[1] 75 mil tensile sheets

As apparent from the above data, good physical properties such as tensile strength, modulus, tear strength, and the like were obtained as well as good hydrolytic stability and fuel "D" resistance.

EXAMPLE 3

The poly(diethylene ether adipate) glycol of Example 2 was compared to two similarly prepared polyurethanes except that the intermediate was replaced by (A) poly(tetramethylene adipate) glycol or (B) polycaprolacton. Various physical data are set forth in Table III.

TABLE III

EFFECT OF POLYOL STRUCTURE ON THE FUEL B RESISTANCE OF THE THERMOPLASTIC POLYURETHANE

| | EX. 2 | A | B |
|---|---|---|---|
| TYPE OF POLYOL | Poly(diethylene ether adipate) glycol | Poly(tetramethylene adipate) glycol | Polycaprolactone |
| Immediate Melt Index, gms./10 min.[1] | 35.0 | 27.0 | 32.0 |
| Original Properties | | | |
| Tensile Strength, psi | 5000 | 8400 | 5640 |
| Elongation, % | 570 | 500 | 430 |
| 300% Modulus, psi | 1900 | 3200 | 3100 |
| Immersion Fuel B, 70 hrs. @ 23° C. | | | |
| Tensile Strength, psi | 4500 (−10) | 5700 (−32) | 4800 (−15) |
| Elongation, % | 600 | 510 | 500 |
| 300% Modulus, psi | 1700 | 2000 | 1900 |
| % Volume Change | 8.43 | 10.95 | 15.38 |
| % Weight Change | 5.89 | 7.64 | 10.30 |
| Immersion Fuel B Two Weeks @ 23° C. | | | |
| Tensile Strength, psi | 4300 (−14) | 5800 (−31) | 4700 (−17) |
| Elongation | 600 | 520 | 520 |
| 300% Modulus, psi | 1700 | 1900 | 2000 |
| % Volume Change | 7.33 | 11.18 | 15.21 |
| % Weight Change | 4.69 | 7.54 | 10.31 |

[1] Conditions 190° C./8700 grams load.
( ) = % Change

As apparent from Table III, the weight and volume change utilizing the polyester intermediate of the present invention, that is Example 2, was much lower that existing heretofore polyurethanes made utilizing the intermediates of A and B.

EXAMPLE 4

A polyurethane very similar to that of Example 1, made in a manner as set forth in Example 1, was tested for styrene resistance and compared to a similar conventional polyurethane made in a manner similar to Example 1 by reacting poly(tetramethylene adipate) glycol, 1,4-butane diol, and MDI.

Procedure

Films of about 250 microns of each test sample were melt coated on release nylon. Test samples were immersed in styrene for 1 day, 3 days, and 7 days respectively. Stress-strain properties, volume swell, and weight gain were measured at the end of each timed immersion. The results are shown in Table IV.

TABLE IV

| Styrene Resistance | CONTROL | | | EX. I TYPE POLYURETHANE | | |
|---|---|---|---|---|---|---|
| | 1d | 3d | 7d | 1d | 3d | 7d |
| Vol. Swell % | 59 | 62 | 68 | 15 | 15 | 13 |
| Wt. Gain % | 43 | 44 | 47 | 24 | 22 | 22 |

As apparent from Table IV, the volume swell and the weight gain of the polyurethane of the present invention was dramatically lower than that of a commercial polyurethane heretofore utilized in fuel resistant applications.

While in accordance with the Patent Statutes, the best mode and preferred embodiment has been set forth, the scope of the invention is not limited thereto, but rather by the scope of the attached claims.

What is claimed is:

1. A high molecular weight, thermoplastic polyurethane characteristically resistant to aliphatic hydrocarbon fuels, said polyurethane adapted for use as an aliphatic hydrocarbon fuel barrier in the construction of flexible fuel containers, the polyurethane comprising:
   a thermoplastic polyurethane having an average molecular weight from about 60,000 to 500,000 comprising a hydroxyl terminated ethylene ether oligomer intermediate having an average molecular weight from about 500 to 5,000 reacted with a non-hindered diisocyanate and an aliphatic extender glycol to produce said thermoplastic polyurethane, said oligomer intermediate being selected from (a) a hydroxyl terminated diethylene glycol-aliphatic linear polyester, or (b) a polyethylene glycol;

wherein said hydroxyl terminated diethylene glycol-aliphatic linear polyester (a) is produced by esterifying a diethylene glycol with an aliphatic dicarboxylic acid having from 4 to 10 carbon atoms;

wherein said polyethylene glycol (b) consists of repeating ethylene ether units n wherein n is from about 11 to about 115, wherein said non-hindered diisocyanate is an aromatic or cyclic aliphatic diisocyanate and, wherein said extender glycol consists of an aliphatic non-ether glycol having from 2 to 6 carbon atoms and containing only primary alcohol groups.

2. A thermoplastic polyurethane according to claim 1, wherein the original tensile strength thereof is at least 3,000 psi, and wherein the tensile strength after 14 days immersion in fuel B is at least 80 percent of the original tensile strength.

3. A thermoplastic polyurethane according to claim 1, wherein said hydroxyl terminated polyester oligomer (a) has an average molecular weight from about 700 to 2500.

4. A thermoplastic polyurethane according to claim 3, wherein said dicarboxylic acid is adipic acid, and wherein from about 5 to about 50 percent excess moles of said diethylene glycol is utilized for each mole of said aliphatic dicarboxylic acid.

5. A thermoplastic polyurethane according to claim 4, wherein the diisocyanate is 4,4'-methylenebis(phenyl isocyanate), and wherein said diisocyanate is simultaneously reacted with said extended glycol and said ethylene ether oligomer intermediate.

6. A thermoplastic polyurethane according to claim 5, wherein the extender glycol is 1,4-butane diol, and wherein the amount of said extender glycol to said oligomer glycol intermediate is from about 0.1 to about 3.0 moles.

7. A thermoplastic polyurethane according to claim 3, wherein the amount of said diisocyanate is from about 0.97 to 1.02 moles for every total one mole of said oligomer intermediate and said extender glycol, and wherein the molecular weight of said thermoplastic polyurethane is from about 80,000 to about 180,000.

8. A thermoplastic polyurethane according to claim 6, wherein the amount of said diisocyanate is from about 0.97 to 1.02 moles for every total one mole of said oligomer intermediate and said extender glycol, and wherein the molecular weight of said thermoplastic polyurethane is from about 80,000 to about 180,000, and wherein the tensile strength of said thermoplastic polyurethane after 14 days immersion in fuel B is at least 85 percent of the original tensile strength.

9. A thermoplastic polyurethane according to claim 8, wherein said thermoplastic polyurethane has a molecular weight of from about 100,000 to about 180,000, and wherein the tensile strength of said thermoplastic polyurethane after 14 days immersion in fuel B is at least 85 percent of the original tensile strength.

10. A thermoplastic polyurethane according to claim 2, wherein said tensile strength retention after days immersion in fuel B is at least 90 percent of the original tensile strength.

11. A process for synthesizing the polyurethane in claim 2, wherein the thermoplastic polyurethane is produced from hydroxyl terminated polyester oligomer produced by esterifying excess equivalents of diethylene glycol with lesser equivalents of adipic acid.

12. A thermoplastic polyurethane according to claim 1, wherein said polyurethane is resistant to styrene.

13. A thermoplastic polyurethane according to claim 5, wherein said polyurethane is resistant to styrene.

14. A thermoplastic polyurethane according to claim 9, wherein said polyurethane is resistant to styrene.

* * * * *